Sept. 19, 1939.    J. E. VOKATY    2,173,134
AUTOMOBILE LICENSE PLATE AND MOUNTING THEREFOR
Filed March 1, 1937
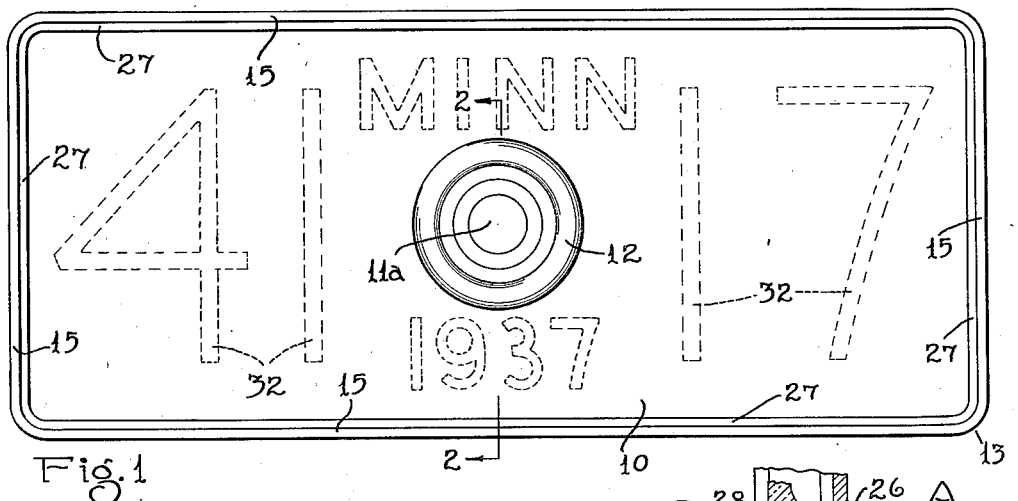
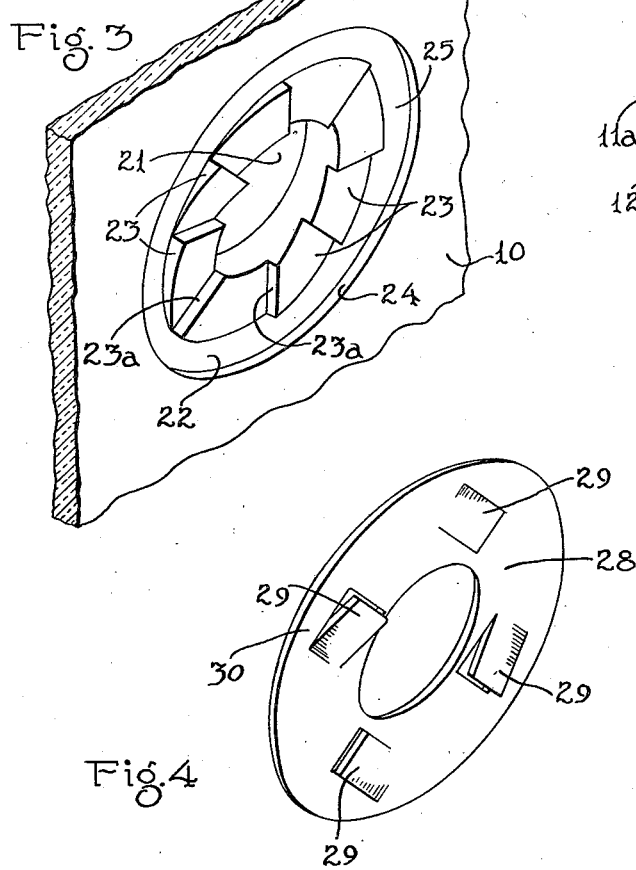
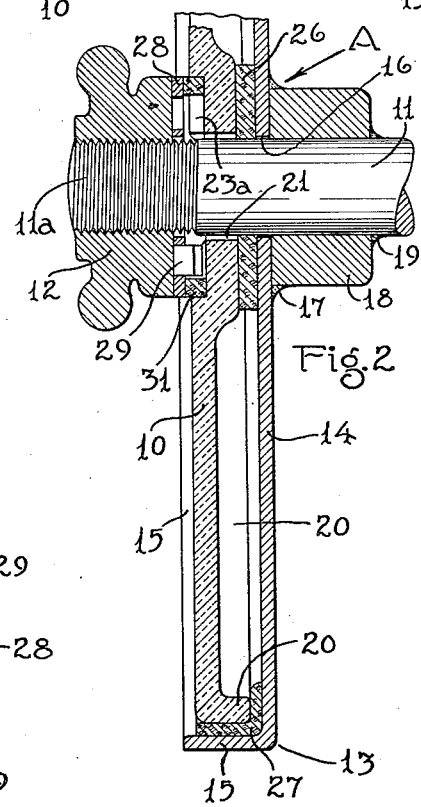
Inventor
Joseph E. Vokaty
By Caswell & Lagaard
Attorneys Patented Sept. 19, 1939

2,173,134

UNITED STATES PATENT OFFICE 2,173,134

AUTOMOBILE LICENSE PLATE AND MOUNTING THEREFOR

Joseph E. Vokaty, Minneapolis, Minn., assignor, by mesne assignments, of one-half to Herbert H. Hoar, Glencoe, Minn.

Application March 1, 1937, Serial No. 128,380

7 Claims. (Cl. 40—125)

My invention relates to improvements in plates and mountings therefor and particularly to automobile license plates and the structures for attaching such plates to automobiles.

The law enforcement authorities are often confronted with cases in which license plates issued for one automobile are illegally used on a different vehicle. In some instances the substitute plates are stolen from one automobile and applied to another which also has been stolen, the purpose in such case being to misinform as to the true identity of the stolen vehicle and by such misinformation evade detection of the automobile theft. This substitution of automobile license plates is sometimes resorted to by fugitives from justice endeavoring to avoid apprehension for previously committed crimes of serious nature. And, too, it sometimes occurs that the owner of one automobile will take his own license plates therefrom and apply them to another vehicle, or allow the same to be done, for one unlawful purpose or another and, usually, merely to avoid the payment of a license fee on the second vehicle for a fractional part of a year.

An object of the present invention is to provide an automobile license plate and a mounting therefor from which the plate can be removed only by shattering the same.

Another object of the invention is to provide a structure, as above, which is relatively simple, durable and inexpensive, and one in which the markings on the plate cannot be tampered with or mutilated by the effects of the elements.

More specifically it is an object of my invention to provide a license or like plate of glass or other shatterable material and to furnish a mounting for such plate together with a keeper adapted normally to secure the plate in place on the mounting and adapted further to shatter the plate, if not previously otherwise shattered, upon movement of the keeper to free the plate from the mounting.

Other objects of the invention reside in the novel combination and arrangement of parts and in the details of construction hereinafter illustrated and/or described.

In the accompanying drawing, Fig. 1 is an elevational view illustrating an automobile license plate and mounting therefor constructed in accordance with my invention, the face of the plate being shown in said view; Fig. 2 is a central sectional view of the structure shown in Fig. 1, said view being somewhat enlarged and taken on the line 2—2 of said Fig. 1; Fig. 3 is a fragmentary perspective view illustrating in detail the central toothed portion of the license plate, and Fig. 4 is a perspective view in detail of the pawl construction employed in connection with the plate attaching nut.

Reference being had to the drawing, it will be seen that the illustrated embodiment of my invention consists essentially of a mounting A and an automobile license plate 10.

The mounting A includes a post 11 which is welded or otherwise permanently secured to a supporting structure, such as the frame or body of an automobile. The terminal portion 11a of said post 11 is threaded and a clamping nut 12 provided therefor, said nut being adapted to be screwed onto said threaded portion 11a of said post and unscrewed therefrom. Further included in the mounting structure A is a guard 13, preferably of heavy sheet metal, comprising a rectangular panel 14 having a continuous marginal flange 15 thereon extending forwardly therefrom. This panel 14 has a central aperture 16 therein through which the terminal portion 11a of the post extends and said panel is welded, as at 17, to a boss 18, which, likewise is welded, as at 19 to the post 11.

The plate 10 is rectangular in form and is of transparent, shatterable material, preferably molded glass. At the back of the plate 10, marginally thereof, is a reinforcing flange 20. Said plate has a central aperture 21 therein and, at its face, is formed with a circular depression 22 coaxially disposed with respect to said aperture. Within said depression 22, the plate 10 is formed with a series of ratcheting teeth 23 which encircle the aperture 21. These teeth 23 are spaced from the wall 24 of said depression to provide a ringe groove 25 between said wall and said teeth 23.

The aperture 21 in the plate 10 is larger in diameter than the diameter of the terminal portion 11a of the post 11 and the outside dimensions of said plate are slightly less than the inside dimensions of the upper and lower and end reaches of the flange 15 on the back panel 14. Thus, said plate 10 may be applied to the mounting A in the manner shown in Figs. 1 and 2, with the aperture 21 in the plate receiving the terminal portion 11a of the post and with the edges of said plate encompassed by the guard flange 15. To avoid glass-to-metal contact, I have shown a washer-like gasket 26 of cork, rubber or other resilient material encircling the post 11 and occupying a position interposed between the guard panel 14 and the back of the plate 10. I have also shown an endless resilient gasket 27, angular in cross-section, fitted in the reentrant angle, formed by the panel 14 and flange 15 of the guard 13. Thus located, the gasket 15 provides a continuous bearing for the edges of the plate 10, said gasket functioning to keep the plate free from contact with the post 11 and, further, to deprive the plate 10 of angular movement relative to said post.

At the back of the nut 12 is a washer-like member 28, struck from resilient sheet metal, said member being suitably secured to said nut, as by spot welding. Struck outwardly from said member 28 are a plurality of ratcheting pawls 29. These pawls 29 are disposed inwardly of a marginal area on said member 28, such area providing an annular bearing surface 30 for said nut.

The nut 12 is applied to the threaded terminal portion 11a of the post 11, as shown in Fig. 2, to clamp the plate 10 in place on the mounting A. Upon screwing the nut 12 into position clamping the plate 10 between said nut and the abutment gasket 26, the annular bearing surface 30 on the member 28 turns against a resilient ring gasket 31 seated in the ring groove 25 in the plate 10. At the same time, the resilient pawls 29 on said member 28 ride over the crests of the ratchet teeth 23 on the plate 10, but, upon passing said crests, spring inwardly behind the shoulders 23a of said teeth. With said pawls thus disposed for endwise engagement with the tooth shoulders 23a, the nut 12 is locked against reverse rotation to unscrew it from the post 11.

Having been applied to the mounting A, the plate 10 cannot be removed, intact, therefrom. It is necessary, therefore, that a mounted plate be shattered to free the nut 12, preparatory to the application of a different plate to the mounting A. While an authorized person desiring lawfully to apply a new plate to the mounting would unhesitatingly shatter the mounted plate with any convenient instrument, an unauthorized person endeavoring to remove the mounted plate, intact, for any purpose, could only attempt, by force, to unscrew the nut 12 from the post 11. With such force applied to said nut, the pawls 29 will engage the shoulders 23a of the teeth 23 on the plate 10 and break the plate, whereby further use thereof is precluded.

The plate 10 is supplied at the back thereof with appropriate indicia 32 (dotted lines, Fig. 1), which can be seen through said plate from the face thereof. Said indicia are shielded by the guard 13 and thus protected against mutilation, as by tampering or by the elements or otherwise.

Changes in the specific form of my invention, as herein disclosed, may be made within the scope of what is claimed without departing from the spirit of my invention.

Having described my invention, what I claim as new and desire to protect by Letters Patent is:

1. In a structure of the character described, a mounting including a post having a threaded terminal portion and an abutment adjacent thereto, a rectangular plate of shatterable material, said plate being formed with a central aperture therein, a series of ratchet teeth at the face of the plate encircling said aperture, and a ring groove encircling said teeth, said plate being adapted to be applied to said post with the apertured portion of the plate receiving said terminal portion of the post and with the plate backed against said abutment, said mounting further including a guard consisting of a back having a continuous marginal flange encompassing said plate and cooperating with the edges thereof to deprive the plate from angular movement relative to the post, a resilient ring gasket seated in the ring groove in said plate, a nut fitting said terminal portion of said post, said nut being adapted to bear against said gasket and clamp the plate against said abutment, pawls on the nut in ratcheting engagement with the teeth on said plate and serving normally, through said teeth, to lock the nut in plate clamping relationship and serving, upon the unscrewing of said nut, to break said plate, if the same has not been otherwise previously shattered to free the nut.

2. In a structure of the character described, a mounting including a post having a threaded terminal portion and an abutment adjacent thereto, a rectangular plate of shatterable material having an aperture therein and a series of ratchet teeth encircling the same, said plate being adapted to be applied to said post with the apertured portion of the plate receiving said terminal portion of the post and with the plate backed against said abutment, said mounting further including a guard consisting of a back having a continuous marginal flange encompassing said plate and cooperating with the edges thereof to deprive the plate from angular movement relative to the post, a nut fitting said terminal portion of said post and having a marginal bearing at the back thereof cooperating with said plate outside of the teeth thereon, and serving to clamp the plate against said abutment, pawls on the back of the nut in ratcheting engagement with said teeth on said plate and serving normally, through said teeth, to lock the nut in plate clamping relationship and serving, upon the unscrewing of said nut, to break said plate, if the same has not been otherwise previously shattered to free the nut.

3. In a structure of the character described, a mounting including a post having a threaded terminal portion and an abutment adjacent thereto, a plate of shatterable material having an aperture therein and a series of teeth encircling the same, said plate being adapted to be applied to said post with the apertured portion of the plate receiving said terminal portion of the post and with the plate backed against said abutment, said mounting further including means cooperating with said plate to deprive it of angular movement relative to the post, a nut fitting said terminal portion of said post and serving to clamp said plate against said abutment, ratcheting pawls carried by the nut and shielded thereby, said pawls cooperating with the teeth on said plate and serving normally, through said teeth, to lock the nut in plate clamping relationship, and serving, upon the unscrewing of said nut, to break said plate, if the same has not been previously shattered to free the nut.

4. In a structure of the character described, a mounting including a post having a threaded terminal portion and an abutment adjacent thereto, a plate of shatterable material having an aperture therein, said plate being adapted to be applied to said post with the apertured portion of the plate receiving said terminal portion of the post and with the plate backed against said abutment, said mounting further including means cooperating with said plate to deprive it of angular movement relative to the post, a nut fitting said post and serving to clamp said plate against said abutment, shielded plate shattering means cooperating with said plate and nut and serving, upon the unscrewing of said nut, to break said plate, if the same has not been previously shattered.

5. In a structure of the character described, a mounting, a plate of transparent shatterable material applicable to the mounting and removable therefrom only upon the shattering of the plate, a guard on the mounting for sheathing the back of the plate, said plate bearing indicia at the back thereof, said mounting having a movable member cooperating with said plate, said member serving normally to lock the plate in place on said mounting and serving, upon being moved from its normal plate locking relationship, to break said plate, if the same has not been previously otherwise shattered.

6. In a structure of the character described, a mounting, a plate of shatterable material carried thereby and removable therefrom only in fragments upon the shattering of said plate, said mounting including a threaded member and a nut adapted to be screwed thereon and against the plate substantially centrally thereof to clamp said plate in place on said mounting, ratcheting means integral with the plate, ratcheting means on the nut coacting with said ratcheting means of the plate and serving therethrough to break the plate into fragments upon the unscrewing of the nut.

7. In a structure of the character described, a mounting, a frangible plate applicable to the mounting, means for securing said plate, while intact, upon said mounting and insuring fragmentizing of the plate upon its removal from the mounting, indicia borne by the plate and visible from the front thereof, a guard member associated with said mounting and guarding and rendering the plate inaccessible from the back thereof, said indicia being so located on said plate as to be guarded and rendered inaccessible from the front of the plate by the plate itself.

JOSEPH E. VOKATY.